United States Patent [19]

Ambs

[11] 4,372,931

[45] Feb. 8, 1983

[54] MICROCRYSTALLINE SYNTHETIC FAUJASITE

[75] Inventor: William J. Ambs, Swarthmore, Pa.

[73] Assignee: Air Products and Chemicals, Inc., Allentown, Pa.

[21] Appl. No.: 325,457

[22] Filed: Nov. 27, 1981

Related U.S. Application Data

[63] Continuation of Ser. No. 154,697, May 30, 1980, abandoned.

[51] Int. Cl.$^3$ .............................................. C01B 33/28
[52] U.S. Cl. .................................... 423/329; 423/328
[58] Field of Search ............................. 423/328–330; 252/455 Z

[56] References Cited

U.S. PATENT DOCUMENTS

| | | | |
|---|---|---|---|
| 3,313,594 | 4/1967 | Wilson | 423/329 |
| 3,516,786 | 6/1970 | Maher et al. | 423/329 |
| 3,676,063 | 7/1972 | Elo et al. | 423/329 |

OTHER PUBLICATIONS

Wolf et al, "Zeitschrift fur Chemie", 13 Jg., 1973, pp. 109–110.
Charnell, "J. Crystal Growth", 8 (1971), pp. 291–293.

Primary Examiner—Edward J. Meros
Attorney, Agent or Firm—Richard A. Donnells, Jr.; E. Eugene Innis

[57] ABSTRACT

Synthetic faujasites in microcrystalline form are obtained by reacting alkali metal silicate in solution with alkali metal aluminate and effecting the crystallization of the reaction product in the presence of a mono- or disaccharide.

11 Claims, No Drawings

MICROCRYSTALLINE SYNTHETIC FAUJASITE

This application is a continuation of application Ser. No. 154,697 filed May 30, 1980, now abandoned.

BACKGROUND OF THE INVENTION

The present invention is concerned with the preparation of faujasite type zeolites in microcrystalline form.

Faujasite is a fairly rare naturally occurring aluminosilicate mineral of defined crystal structure. Products having substantially the same crystal pattern as this natural mineral have been synthesized by reaction of silicon compounds with aluminum compounds in aqueous alkaline solutions. Among the synthetic faujasite products thus synthesized which have found extensive industrial use are so-called X-type zeolites and Y-type zeolites. The preparation of X-type zeolites is described in U.S. Pat. No. 2,882,244. The preparation of Y-type zeolites is described in U.S. Pat. No. 3,130,007. These synthetic faujasites may be represented by the general formula:

$$Alk_2O:Al_2O_3:2\text{-}7SiO_2:nH_2O.$$

By the usual methods of the prior art, these synthetic faujasites are produced in the form of crystals having an average size range of 1 to 3 microns. It is proposed in U.S. Pat. No. 3,516,786 to produce synthetic faujasites in microcrystalline form, stated to be in the 100–1000 Angstrom range. In the method disclosed in said patent, an alkali metal silicate solution is admixed with an alkali metal aluminate solution in proportions to provide a $SiO_2/Al_2O_3$ mole ratio of from 4 to 20 and the obtained reaction mixture is aged for 6 to 24 hours at moderate temperature; the aged composition is then heated for 2 to 16 hours to effect crystallization in the presence of a water-miscible organic solvent added to the composition at any stage prior to the heating step.

Because of the relative volatility of the organic solvents proposed in accordance with said prior patent, part of this additive is driven off during the crystallization of the product at elevated temperature, so that the concentration of such additive is not constant. This disadvantage is overcome in the crystallization of the faujasite reaction product by the additives employed in the present invention.

SUMMARY OF THE INVENTION

It has now been found in accordance with the present invention, that microcrystalline faujasite is obtained in high yield when the faujasite product obtained by the reaction of the silicon and aluminum compounds is crystallized in the presence of a solid mono- or di-saccharide compound.

DETAILED DESCRIPTION

For the preparation of the synthetic faujasite in microcrystalline state, the usual proportions of reactants are employed. Thus the reaction may be carried out employing as reactants an aqueous alkali metal silicate solution and an aqueous alkali metal aluminate solution to provide a molar ratio of $SiO_2/Al_2O_3$ in the range of 3 to 15, preferably in the range of 4 to 10 and an alkali metal oxide/$Al_2O_3$ ratio in the reaction mixture of 5 to 20, preferably 7–15. The amount of water in the mixture may vary over a fairly wide range, as from about 150–600 $H_2O/Al_2O_3$, but should preferably be in the range of from 220 to 430.

The initial admixture of the reactant solutions is best carried out with each of the solutions somewhat cooled to below room temperature, as in the range of up to about 10° C., preferably there below but short of freezing. After blending the cooled solutions of alkali metal silicate and alkali metal aluminate, the reaction mixture is let stand for at least several minutes before adding the sugar, after which addition the mixture is aged, first at room temperature for at least 5, and preferably for 10 or more hours with stirring. It is then heated to about 100° C. for an additional several hours to promote crystallization while stirring. The product is filtered to remove the obtained microcrystals from the mother liquor and dried.

The zeolite product obtained shows the typical X-ray diffraction pattern identified as a faujasite with the characteristic broadening of the lines typical in microcrystalline material.

EXAMPLE 1

Materials

A. 50% sodium hydroxide solution
B. Sodium silicate solution (29.2% $SiO_2$ and 8.92% $Na_2O$), 96 grams
C. Crushed ice
D. Sodium aluminate (65–70% purity) 18.3 grams
E. Sucrose
F. Distilled or demineralized water

Procedure

1. Place 78 ml of $H_2O$ in a 600 ml beaker.
2. Add 29.5 ml of A with stirring. Cool to ambient.
3. Add B with stirring. Chill to <5° C.
4. Place 61 ml of $H_2O$ in a beaker (preferably not glass).
5. Add 25.5 ml of A with stirring. Then add D and heat until solution clears.
6. Chill to <5° C.
7. Add 75 g of C to the mixture from procedure step No. 3 and let stand. Temperature should be about ≦4° C.
8. Add 75 g of C to the mixture from step #6.
9. Blend the result of step #8 with the result of step #7 with stirring.
10. Let stand 5 minutes.
11. Add 12 gms of E.
12. Age at about 20° C. for 16 hours preferably in Teflon, stainless steel, or other non-glass container with stirring.
13. Heat to 100° C.
14. Age at 100° C. for 4 hours with stirring.
15. Filter, wash, dry at 250° F. (~120° C.) for 4 hours.

Product yield was 73% by weight of total solids. The crystals had a mean crystallite size of 367 angstroms.

In following the same reactants and procedures as above, but substituting anhydrous dextrose (D-glucose) for the sucrose, a 70% yield is obtained. The crystals had a mean crystallite size of 417 Angstroms.

The reaction conditions deemed best suited for obtaining the desired microcrystalline product in high yield are at ambient pressure employing ratios of
$SiO_2/Al_2O_3=6.2$
$Na_2O/Al_2O_3=9.8$
$H_2O/Al_2O_3=318.5$ The initial aging at the lower temperature may be carried out at a temperature of 5°–50° C., preferably at 10°–25° C., for 6 to 24 hours, preferably at 12 to 20 hours. The lower the temperature employed, the longer the aging time required. The subsequent warm aging (crystallization temperature) may be from 25°–120° C., but above that of the initial aging for 3 to 260 hours, preferably, 50°–110° C. for 3 to 10 hours. Here again, the lower the temperature, the longer the time required for complete crystallization.

The concentration of sugar in the crystalizing mixture may be from 1.5 to 5% by weight of the reaction mixture, preferably from about 2 to 3.5%.

Other mono- and di-saccharides or mixtures thereof may be employed as additives instead of dextrose or sucrose, to obtain crystallization of the faujasite in microcrystalline form.

In the repeated runs carried out using dextrose and sucrose respectively, the range of crystal sizes produced was from 328 to 693 Angstroms; the 328 Angstrom crystals were obtained in a run with dextrose as additive.

What is claimed:

1. The method of obtaining synthetic faujasite in microcrystalline form which comprises mixing an aqueous alkali metal silicate solution with an aqueous alkali metal aluminate solution, at a temperature from below about 10° C. to short of freezing and in proportions of alkali metal silicate and alkali metal aluminate such as to furnish a $SiO_2/Al_2O_3$ mole ratio in the reaction mixture in the range of from 4 to 10 and to obtain a faujasite structure, adding an additive selected from the group consisting of solid mono- and disaccharides and mixtures thereof in an amount of 1.5 to 5% by weight of the total reaction mixture, initially aging the reaction mixture for 6 to 24 hours at 5° to 50° C. followed by subjecting the aged mixture to increased temperatures in the range of about 25° to 120° C. and above the initial aging temperatures for 2 to 24 hours; thereafter separating the formed microcrystals from the mother liquor.

2. The method as defined in claim 1 wherein the initial aging is carried out for 12 to 20 hours and the subsequent heating is to 25°–120° C. for 3 to 260 hours.

3. The method as defined in claim 1 wherein said initial aging is effected at about ambient temperature for a period of 16 hours.

4. The method as defined in claim 3 wherein the subsequent heating is effected for 4 hours at about 100° C.

5. The method as defined in any of claims 1, 3 or 4 wherein said additive is sucrose.

6. The method as defined in any of claims 1, 3 or 4 wherein said additive is dextrose.

7. The method as defined in claim 1 wherein the additive comprises 2 to 3.5% by weight of the total reaction mixture.

8. The method as defined in claim 1 wherein the alkali metal silicate and alkali metal aluminate are such as to furnish a $SiO_2/Al_2O_3$ mole ratio in the reaction mixture of about 6.2.

9. The method of forming faujasite in microcrystalline form, which comprises mixing an aqueous sodium silicate solution with an aqueous sodium aluminate solution at temperatures to from below about 10° C. to short of freezing, adding thereto a sugar compound selected from the group consisting of solid mono-and disaccharides and mixtures thereof in an amount of 1.5 to 5% by weight of the total reaction mixture, initially aging the obtained mixture for 12 to 20 hours at about ambient temperature, heating the initially aged mixture for 3 to 10 hours at a temperature in the range of about 50° to 110° C.; then separating the formed microcrystals from the mother liquor.

10. The method as defined in claim 9 wherein said sugar compound is sucrose.

11. The method as defined in claim 9 wherein said sugar compound is dextrose.

* * * * *